United States Patent [19]

Boutier et al.

[11] Patent Number: 4,895,442

[45] Date of Patent: Jan. 23, 1990

[54] VELOCIMETER WITH AN OPTICAL FIBER MOSAIC

[75] Inventors: Alain Boutier, Bures; LeFevre Jean, Fontenay-Aux Roses, both of France

[73] Assignee: Office National D'Etudes Et De Recherches Aerospatiales (O.N.E.R.A), Chatillon, France

[21] Appl. No.: 149,191

[22] Filed: Jan. 27, 1988

[30] Foreign Application Priority Data

Jan. 30, 1987 [FR] France .................................. 87 01150

[51] Int. Cl.⁴ ............................ G01P 3/36; G02B 6/32
[52] U.S. Cl. ...................................... 356/28; 356/28.5; 350/96.18
[58] Field of Search ......................... 73/861.05, 861.06; 350/96.15, 96.18; 128/666, 691, 692

[56] References Cited

U.S. PATENT DOCUMENTS

| | | | |
|---|---|---|---|
| 4,282,527 | 8/1981 | Winderman et al. | 250/96.18 |
| 4,396,943 | 8/1983 | Lord et al. | 356/28 X |
| 4,552,456 | 11/1985 | Endo | 356/5 |
| 4,659,218 | 4/1987 | De Lasa et al. | 356/133 |
| 4,746,211 | 5/1988 | Ruth et al. | 356/28.5 |

FOREIGN PATENT DOCUMENTS 0218654 12/1983 Japan .................................. 356/28
0129762 6/1987 Japan .................................. 73/861.05

OTHER PUBLICATIONS

Ishida et al., "Measurement of Velocity and Direction of Flow of Solid Particles in a Fluidized Bed," *Powder Technology*, vol. 27, No. 1, Sep.-Oct. 1980, pp. 1-6.

*Primary Examiner*—Thomas H. Tarcza
*Assistant Examiner*—Linda J. Wallace
*Attorney, Agent, or Firm*—Lowe, Price, LeBlanc, Becker & Shur

[57] ABSTRACT

Velocimeter comprises a measuring volume (100) in a particle-laden fluid stream, means for brightly illuminating the measuring volume and means for measuring, based upon the light scattered by said particles when they are illuminated, the velocity of the said fluid stream, having a mosaic of optical fibers (10) and at least one optical system (101) for projecting a plane of the measuring volume onto the mosaic's input plane, the mosaic's outputs being connected to the velocity measuring means.

13 Claims, 4 Drawing Sheets

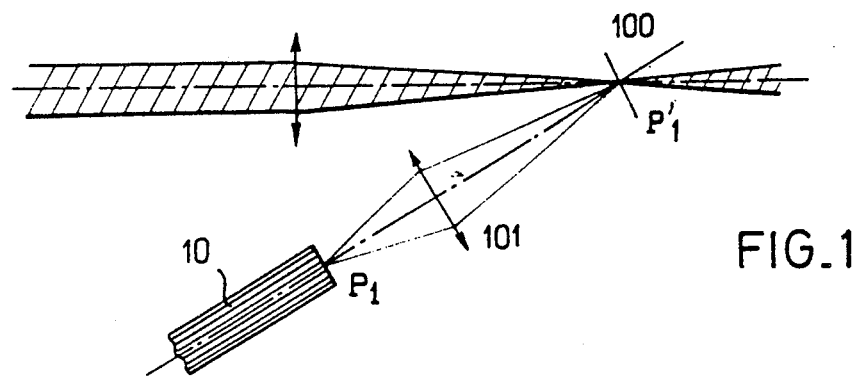
FIG_1
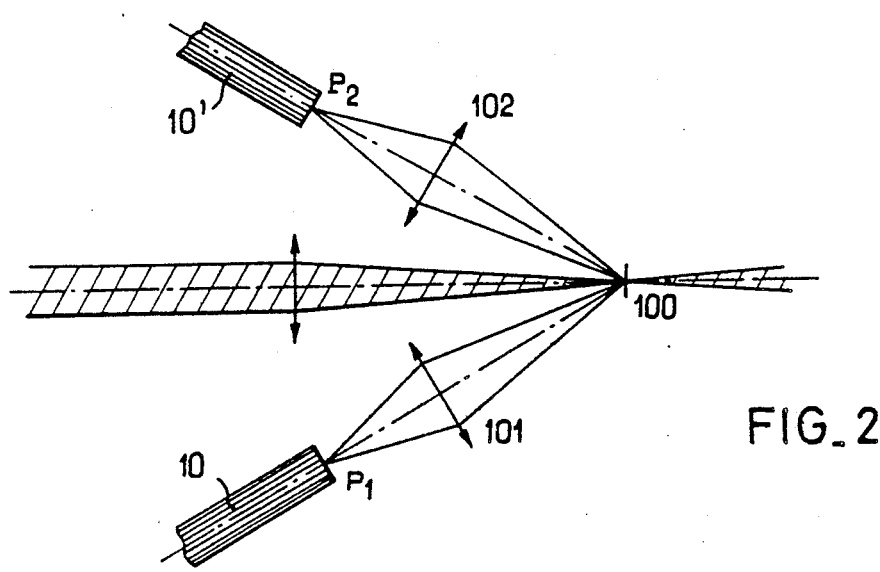
FIG_2
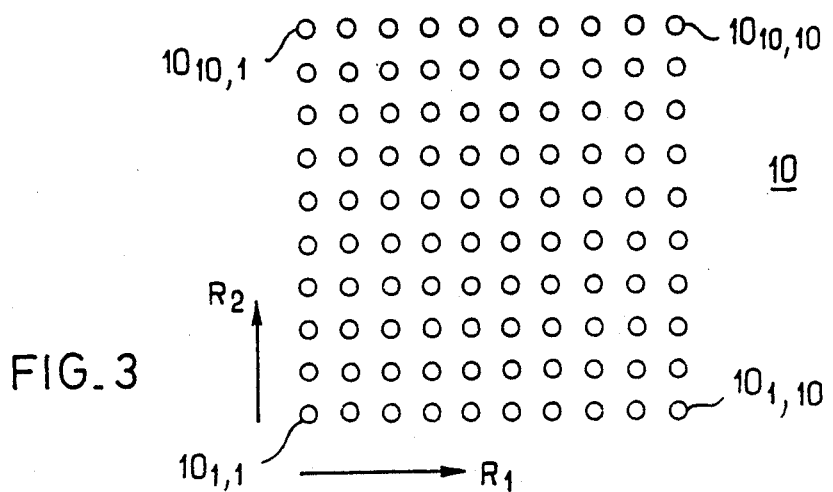
FIG_3

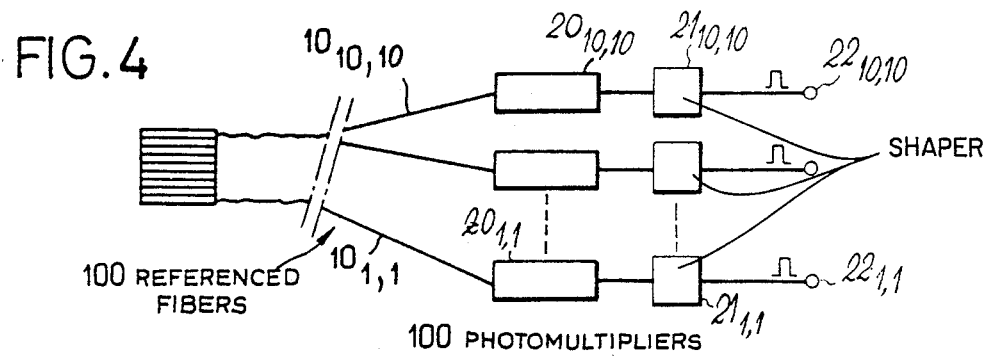
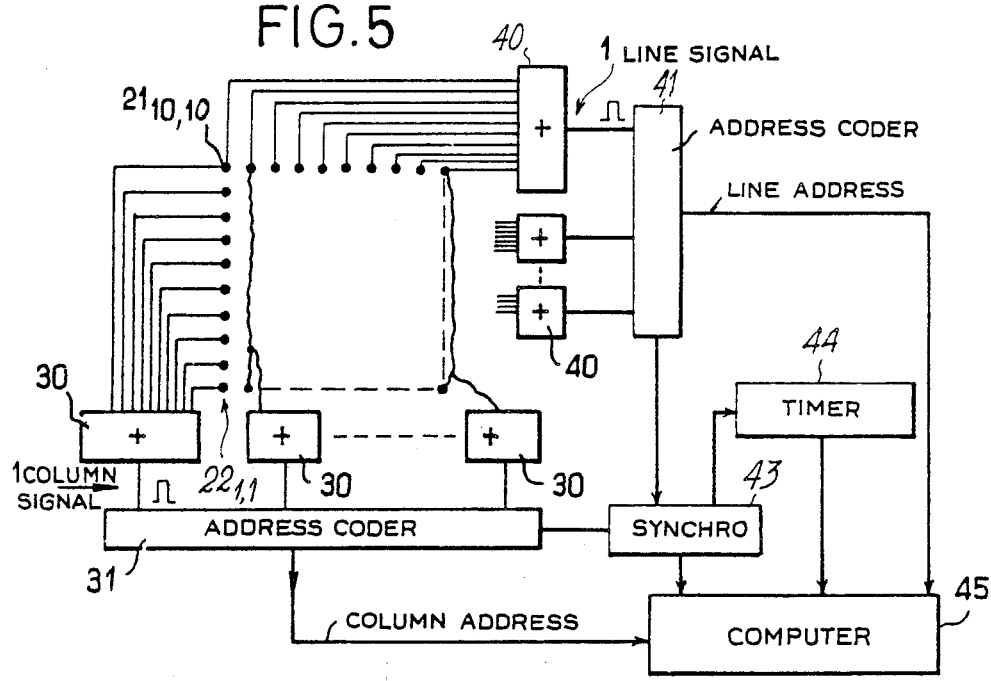
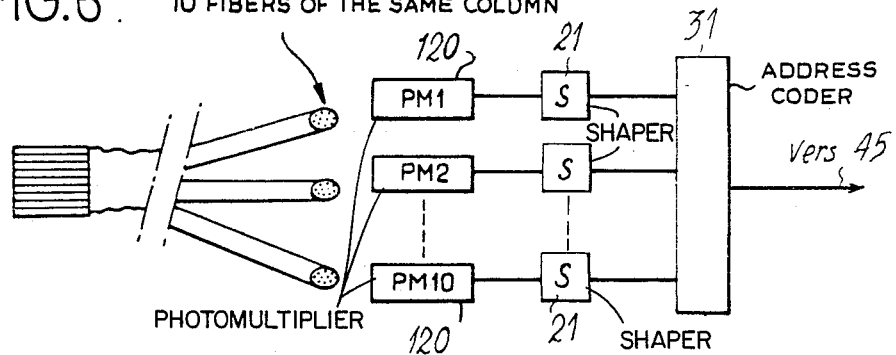

$S_1$ REFLECTS ½ AND TRANSMITS ½

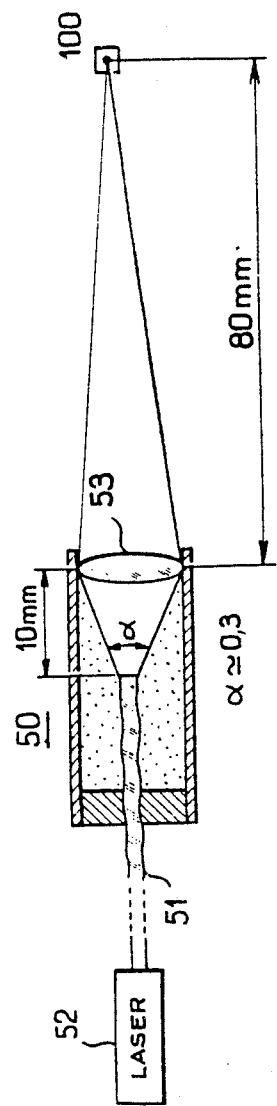
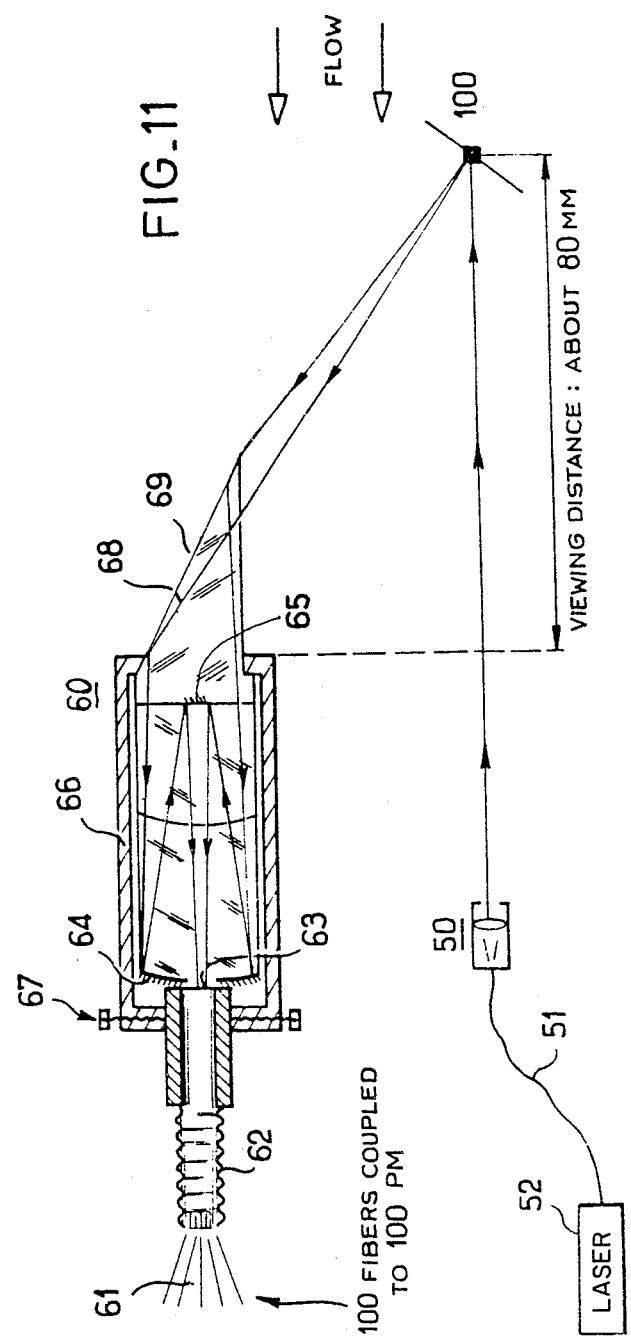

VELOCIMETER WITH AN OPTICAL FIBER MOSAIC

BACKGROUND OF THE INVENTION

1. Field of the Invention

This invention concerns a velocity measuring method and device based on the diffusion of light by particles traversing a small measuring volume formed in a highly illuminated stream of a gaseous/liquid fluid and more specifically concerns a method and device for velocity measurement using an array, or mosaic, of optical fibers and not requiring the coherent properties of light.

2. Description of the Prior Art

Fringing laser velocimeters are presently able to simultaneously measure three components of speed in very turbulent flows. They require the use of a very complex, costly system for spitting a coherent beam, which must be aligned for each application. Moreover, they cannot take measurements at less than ten millimeters from a wall struck normally by the beams.

Two-point velocimeters can measure very close to walls, but only in flows with very little turbulence ($\tau_u < 10\%$). The two-line velocimeter, although able to measure close to walls in more turbulent flows ($\tau_u \approx 20\%$), does not operate in recirculation areas where the orientation of the velocity vector exhibits considerable fluctuation: as can be readily understood, any particle moving parallel to the lines will not be measured.

OBJECT OF THE INVENTION

The object of this invention is to provide a velocimeter capable of making velocity measurements in highly turbulent flows and close to the walls, and therefore in an environment of intense spurious light. Moreover, its utilization in propulsion system air supply intakes has led to the practical development of a miniaturized optical probe.

The measuring volume consists of a brightly illuminated area, possibly illuminated by lamps, but more generally illuminated by a focused laser beam whose coherent properties are not used.

SUMMARY OF THE INVENTION

The invention accordingly provides a velocimeter comprising a brightly illuminated measuring volume in a particle-laden fluid stream and means for measuring, based upon the light scattered by said particles when they are illuminated, the velocity of the said fluid stream, and further comprising a mosaic of optical fibers and an optical system for projecting a plane of the measuring volume onto the mosaic's input plane, the mosaic's outputs being connected to the measuring means.

BRIEF DESCRIPTION OF THE DRAWINGS

Further features and advantages of the invention will be apparent from the following particular description of several preferred embodiments of this invention as illustrated in the corresponding accompanying drawings in which:

FIG. 1 shows a velocimeter according to the invention with a mosaic of optical fibers;

FIG. 2 shows a velocimeter according to the invention with two optical fiber mosaics;

FIG. 3 shows the plane of the inputs of the optical fibers making up the mosaic;

FIG. 4 shows the photomultipliers coupled to the optical fibers;

FIG. 5 is a diagram of the velocimeter's signal processing system which adds electronic signals;

FIG. 6 and 7 diagram the velocimeter's signal processing system which adds optical and electronic signals;

and FIGS. 9, 10 and 11 respectively show a velocimeter according to the invention installed in an air intake and the velocimeter's transmitting and receiving heads.

DESCRIPTION OF THE PREFERRED EMBODIMENTS

Figure 7:
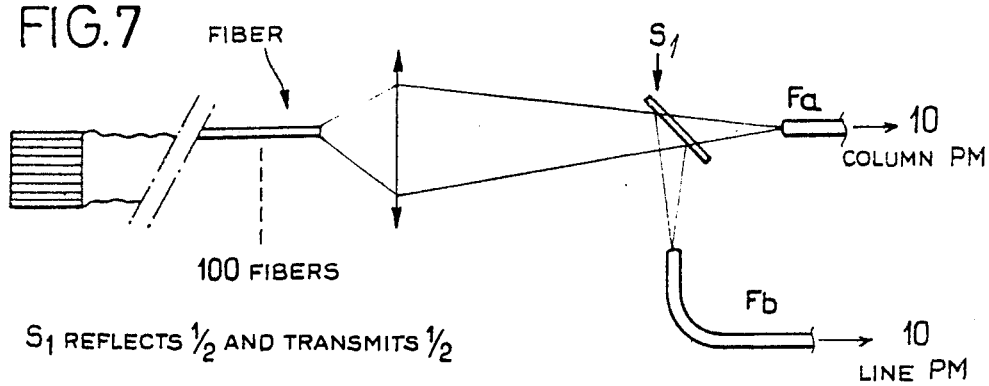

Referring first to FIGS. 1 and 2, the light scattered by the particles traversing the the brightly illuminated measuring volume 100 is collected by collector optics 101 which focus it onto a mosaic 10 of one-hundred optical fibers. The input plane $P_1$ of this fiber mosaic has a conjugate plane $P'_1$ in the measuring volume. The mosaic, which provides spatial encoding after receiving the scattered light, therefore detects the projection of the velocity vector $V^\rightarrow$ of the flow in the plane $P'_1$, which gives access to the simultaneous measurement of two velocity components $R_1$ and $R_2$. We thus have a two-dimensional velocimeter. By way of example, the optics 101 having a magnification of 10, the measuring volume 100 having a diameter of 300 $\mu$m, each graded index fiber has a diameter of 220 $\mu$m and a core of 200 $\mu$m, which shows that the blind spots between fibers are extremely limited. By adding second receiving optics 102 aimed at the volume 100 from a different direction, two other components $R_3$ and $R_4$ can be measured, thus realizing a three-dimensional velocimeter. Alternatively, $R_4$ and $R_2$, for example, can be chosen as vertical components to obtain a redundant measurement.

In fact, the distances here are in the image plane of the receiving optics instead of in the measuring volume, as they are in fringing, two-point, two-line and two-cross velocimeters. The light collector optics 101 must be of outstanding quality (limited by diffraction) for the image of a particle in the plane $P_1$ to be much smaller than the diameter of each fiber.

The fibers can be arranged as in the matrix shown in FIG. 3, but alternate arrangements are possible, as for example, a pattern derived from FIG. 3 by offsetting every other line (or every other column) by an amount equal to half the fiber spacing, such as to eliminate the empty spaces between lines and columns.

Each fiber $10_{1,1}$ to $10_{10,10}$, which can be several meters long, is connected to a photomultiplier tube, namely tubes $20_{1,1}$ to $20_{10,10}$ respectively in FIG. 4. Each mosaic of optical fibers (whether or not it is preceded by a mosaic of micro-lenses) is therefore associated with a battery of photomultipliers.

When a particle passes through the measuring volume 100, the photomultipliers 20 concerned (those connected to the fibers in plane $P_1$ on the line of projection of the particle's path) supply electric pulses which, by suitable electronic processing, can be traced back to the instantaneous velocity vector in plane $P'_1$. When there are two receiving optics, as in the velocimeter diagramed in FIG. 2, the laser-based, optical fiber mosaic velocimeter according to the invention thus gives access to the modulus and the orientation in space of the instantaneous velocity vector of each particle.

The specific advantage of this type of velocimeter in terms of signal-to-noise ratio resides in that each detector, via the intermediary of each optical fiber, "sees" only a small part of the measuring volume (and thus, in the same proportion, of the luminous flux reflected by a near wall), thus considerably reducing noise level. This feature is particularly worthwhile because the fundamental limitation of laser velocity measurements near a wall comes from the saturation of the photomultiplier tubes by the continuous background noise from spurious light. One the other hand, when a particle passes through measuring volume 100 the signal is exactly the same as that of a fringe-type velocimeter, for the image of the mosaic in plane P' (inside volume 100) is typically the size of the double crossed fringe grating of a two-dimensional fringe-type velocimeter. Theoretical analysis of the signal-to-noise ratio indicates a minimum wall distance of the order on 1 mm, which distance has been confirmed by experiment.

DESCRIPTION OF SIGNAL PROCESSING

Each fiber $10_{i,j}$ is coupled to a photomultiplier $20_{i,j}$ where i and j lie between 1 and 10 (FIGS. 4 and 5). The signals appearing at the inputs to the photomultipliers in response to the passage of a particle are fed individually to the inputs of threshold amplifiers 21 which deliver at the output 22 noise-free logic signals.

The logic signals of a given column are fed to the inputs of a summing logic operator 30 to generate a column signal (FIG. 5). The ten column signals thus generated are applied to the input of an address encoder 31 which, when it receives a pulse at one of its inputs, delivers at its output a binary code representative of the address of the column concerned by the passage of a particle. The output of column signals encoder 31 is connected to an input of the computer 45. The logic signals of a given line are fed to the inputs of a summing logic operator 40 to generate a line signal. The ten line signals thus generated are applied to the input of an address encoder 41 which outputs a binary code representative of the address of the line concerned by the passage of the same particle. The output of the line signals encoder 41 is connected to another input of the computer 45.

The encoders 31, 41 simultaneously deliver along with the binary address code a control signal, to a synchronizing circuit 43 which triggers a phase of synchronous acquisition of the column and line addresses and starts a timer 44 which measure the time a particle takes to pass, for example from one fiber to the next, or from the first to the last fiber it meets.

The computer 45 handles data acquisition and storage, and computes the speed and direction associated with each particle, as well as the parameters characterizing the turbulence. In an alternative embodiment of the signal processing system, the photomultipliers and their threshold amplifiers are associated on the basis of any desired pattern, rather than on the basis of columns and lines. For instance, they can be associated according to the parallel lines at 45° to the above-described matrix so as to obtain the coordinates of the fibers affected by the passage of a particle in another system of coordinates.

Referring now to FIG. 6, it can be seen that the ten optical fibers of a given column are connected to a single given photomultiplier 120. In this case, the noise in ten fibers is added in the same given photomultiplier, thus degrading the signal-to-noise ratio. However, only ten photomultipliers are required for one component and only twenty are required for two components (horizontal, vertical), compared with 100 in the other design. Nevertheless, the signal must be optically separated (the beam split) at the end of each fiber, as shown in FIG. 7.

The flux emitted by each of the 100 fibers is divided into two equal parts sent to two optical fibers $F_a$, $F_b$. The a-type fibers are grouped by column to feed ten photomultipliers as in FIG. 6. The b-type fibers are likewise grouped, except by line, to feed ten other photomultipliers; hence the twenty photomultipliers in this embodiment.

Figure 8:
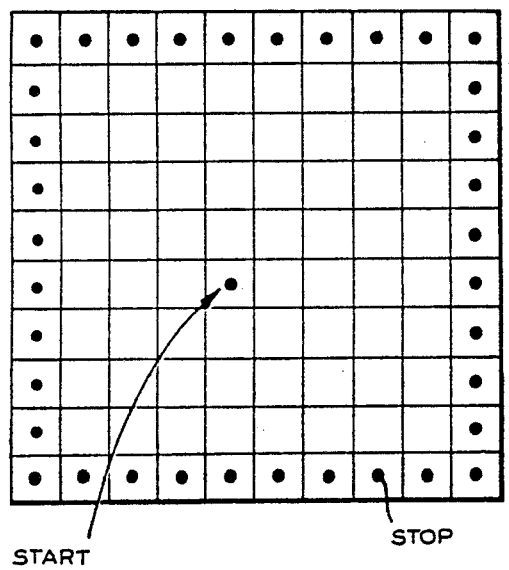
FIG. 8 shows an optical fiber mosaic with a start fiber and stop fibers.

FIG. 8 shows a mosaic of optical fluxes in a square matrix pattern and having a center fiber, or a group of fibers forming an optical barrier whose transmitted signal is a start (start counting) signal. This matrix also has fibers at its periphery forming the other optical barrier for the transmission of a stop (end counting) signal. This stop barrier is on a closed line with a square configuration, but any other closed geometrical figure can be used.

In the square configuration, a particle traversing the entire mosaic first trips a stop signal which is not taken into account. It then trips a start signal at the center fiber and a stop signal at one of the peripheral fibers. This peripheral fiber serves to measure the modulus and orientation of the velocity vector having triggered the start-stop pair.

It can be seen that this setup is a clear improvement over the conventional two-point velocimeter, which requires rotating the assembly to change the orientation of the line connecting the two points and to determine the angular distribution of the velocity vectors in a turbulent flow.

The invention can also be used as a two-point velocimeter, either by grouping the fibers, or by selecting two fibers of the mosaic. The orientation of the line connecting the two points can be easily changed by selecting a fixed start fiber (or group of fibers) and changing the fiber which gives the stop signal. Such a change can be made by selecting the signals from the optical fibers concerned.

The invention can further be used as a two-line velocimeter by taking the signals from the fibers of two columns, two lines or two diagonals.

Furthermore, the inventive velocimeter can also provide direct visualization of flows. In this application, the time domain data is lost but the particle's trajectory is stored by means integrating the luminous flux over time. For this purpose, the photomultipliers can be connected to light emitting diodes arranged in a mosaic pattern to provide a viewing screen. Also, the fibers of the optical fiber matrix can be connected to an image intensifier tube (a microchannel tube for example) interfaced to a mosaic of charge transfer devices (CCD) or to a photographic or video recorder.

Figure 9:
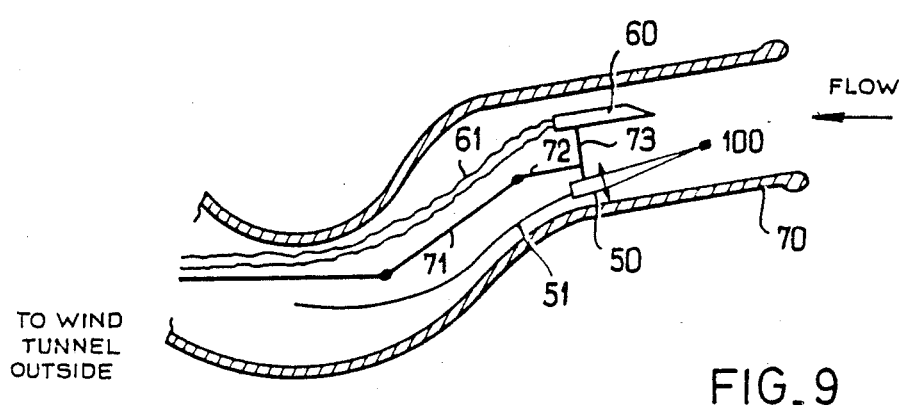

FIG. 9 shows an embodiment of the inventive velocimeter in the form of a probe designed for measurements in the air intake stream of a propulsion system. Reference numeral 70 designates an air sleeve lacking any lateral optical access. The only possible optical access is through the downstream end of the sleeve, by optical fibers 51 and 61. Within this air sleeve is an articulated rod 71. The last upstream section 72 of the rod has a mount 73 carrying an emitting head 50 and a receiving head 60, both of which will now be described in greater detail with reference to FIGS. 10 and 11, respectively.

The emitting optical head 50 comprises a laser 52 feeding an optical fiber 51. The divergent beam leaving fiber 51 is focused by the objective lens 53 on the measuring volume 100. Typical practical dimensions of this embodiment are: the optical fiber 51 has a core diameter of 100 μm, the beam's initial divergence angle is $\alpha \simeq 0.3$ rad; the objective 53 has a focal length of 20 mm and a diameter of 10 mm; and the measuring volume is 80 mm away from the objective and has a diameter of approximately 300 μm.

In FIG. 11, numeral 61 designates a bundle of a hundred optical fibers arranged in a mosaic pattern. The fibers are bundled by a sheath 62. The mosaic 10 input plane 63 is applied against the back of the mirror of a Cassegrain telescope 64, 65. This telescope is secured in a tubular mount 66 making it fast with the optical fiber mosaic. Clamping screws 67 are used to secure the whole as a unitized assembly consisting of the Cassegrain telescope (which is the collecting optics for the luminous flux scattered by the aerosols) and the fiber mosaic.

In this example, the telescope consists of two lens systems 64 and 65 of suitable index bonded to one another and having reflective surfaces 64 and 65 at their ends respectively forming the primary and secondary mirrors. Lastly, numeral 68 designates a prism whose total reflection face 69 is bonded to the telescope face carrying the secondary mirror 65.

Typical numerical values in this setup are: telescope diameter 20 mm; magnification ×10; aperture f/5. This means that the back face of 64 is located approximately 100 mm from the measuring volume.

FIG. 11 details the emitting head 50 and receiving head 60, both of which are carried by the mount 73 in FIG. 9. In practice, the emitting head 50 and receiving head 60 are housed inside a cylindrical case supported by the rod 72. This accordingly provides an easy-to-handle "pencil" probe.

Irrespective of its specific embodiment, the invention can be used outside of the fluid stream in the conventional way, by aiming it at the fluid medium through a window.

What we claim is:

1. A velocimeter comprising:
   a measurement volume in a fluid flow containing microparticles;
   means for illuminating said measurement volume so that microparticles in the volume illuminated by energy from the means for illuminating diffuse the light incident thereon;
   means for deriving the velocity of said fluid flow from the light diffused by the illuminated particles;
   an optical fiber mosaic having an input plane;
   an optical system for projecting an object plane in the measurement volume onto the input plane of said mosaic; and
   means for connecting outputs of the optical fiber mosaic to said velocity deriving means,
   the mosaic optical fibers being arranged in a line and column matrix, the fibers having outputs optically split into two equal parts to first and second optical fibers collectively coupled to common line and column photodetectors.

2. A velocimeter comprising:
   a measurement volume in a fluid flow containing microparticles;
   means for illuminating said measurement volume so that microparticles in the volume illuminated by energy from the means for illuminating diffuse the light incident thereon;
   means for deriving the velocity of said fluid flow from the light diffused by the illuminated particles;
   an optical fiber mosaic having an input plane;
   an optical system for projecting an object plane in the measurement volume onto the input plane of said mosaic; and
   means for connecting outputs of the optical fiber mosaic to said velocity driving means,
   the outputs of the mosaic optical being respectively coupled to photodetectors arranged in line and column matrices, the photodetectors being connected to inputs of threshold amplifiers, outputs of said threshold amplifiers of the photodetectors of one and the same column of said matrix being connected to an input of an adder circuit to form a column signal, outputs of the threshold amplifiers of the photodetectors of one and the same line of said matrix being connected to the adder circuit to form a line signal, the line signal and the column signal having values commensurate with the values of the velocity components.

3. A velocimeter according to claim 2 wherein the mosaic optical fibers are arranged in a line and column matrix, the fibers having outputs optically split into two equal parts to first and second optical fibers collectively coupled to common line and column photodetectors.

4. The velocimeter of claim 2 further comprising:
   first and second optical fiber mosaics;
   first and second optical systems for respectively projecting first and second different object planes in the measurement volume onto the input planes of said mosaics; and
   means for connecting the outputs of the first and second optical fiber mosaics to means for deriving two velocity components of the flowing fluid.

5. The velocimeter of claim 2 wherein the projecting optical system is a Cassegrain telescope having a primary mirror and a secondary mirror, the optical fiber mosaic being located behind an aperture of the telescope primary mirror.

6. A velocimeter for measuring the velocity of a fluid flow containing microparticles, said velocimeter comprising
   means for illuminating a predetermined measurement volume in said fluid flow whereby a microparticle crossing said volume produces scattered light,
   optical fibers each having an input end and an exit end, said input ends of said fibers being arranged in an array having first and second coordinate directions, said array being located in an input plane, the fiber ends in the array being arranged so that multiple ends of said fibers extend in each of said coordinate directions, multiple groups of the multiple ends in the first coordinate direction being provided, multiple groups of the multiple ends in the second coordinate direction being provided,
   optical means for projecting an object plane in said measurement volume onto said input plane,
   a plurality of detecting means for detecting said scattered light coupled through said projecting means and emerging from said exit ends of said optical fibers, respectively, thereby providing electrical pulses for said first and second coordinate directions,
   first adding means for adding said electrical pulses provided by said detecting means in the first coordinate direction of the input plane array thereby producing first pulses, second adding means for adding said electrical pulses provided by said detecting means in the second coordinate direction of the input plane array thereby producing second pulses, and computing means for deriving two components of said velocity from said first and second pulses.

7. The velocimeter of claim 6 wherein the fibers in the input plane are arranged in a row and column matrix so that the first pulses are row pulses provided by said detecting means row by row and the second pulses are column pulses provided by said detecting means column by column.

8. The velocimeter of claim 7 further comprising other optical fibers having input ends arranged in another row and column matrix and located in another input plane, other optical means for projecting another object plane in said measurement volume onto said other input plane, and another plurality of detecting means and other first and second adding means interconnected between exit ends of said other optical fibers and said computing means whereby said computing means derives at least a third component of said velocity.

9. The velocimeter of claim 6 wherein said projecting optical means includes a Cassegrain telescope having a primary mirror and a secondary mirror, said secondary mirror having a central opening behind which said input ends of said optical fibers are located.

10. A velocimeter for measuring the velocity of a fluid flow containing microparticles, said velocimeter comprising means for illuminating a predetermined measurement volume in said fluid flow whereby a microparticle crossing said volume produces scattered light, first optical fibers each having an input end and an exit end, said input ends of said first fibers being arranged in a row and column matrix located in an input plane, optical means for projecting an object plane in said measurement volume onto said input plane, optical splitting means for equally coupling said exit end of each of said first optical fibers to input ends of second and third respective optical fibers, a plurality of first detecting means respectively associatedd with the matrix rows, each of said first detecting means detecting a first portion of said scattered light that emerges from said exit ends of said first fibers located in one respective row and is transmitted through said second respective fibers, thereby providing row pulses, a plurality of second detecting means respectively associated with the matrix columns, each of said second detecting means detecting a second portion of said scattered light that emerges from said exit ends of said first fibers located in one respective column and is transmitted through said third respective fibers, thereby providing column pulses, and computing means for deriving two components of said velocity from said row pulses and said column pulses.

11. A velocimeter for measuring the velocity of a fluid flow containing microparticles, said velocimeter comprising a laser source for radiating a beam to be incident on the flowing fluid, a first optical fiber for guiding said incident beam, optical means for focusing said incident beam transmitted through said first optical fiber onto an object plane in a measurement volume in said fluid flow, whereby a microparticle crossing said volume produces a scattered beam, optical means for projecting said object plane onto an input plane, second optical fibers having input ends located in said input plane arranged in an array having first and second coordinate directions, the fiber ends in the array being arranged so that multiple ends of said fibers extend in each of said coordinate directions, multiple groups of the multiple ends being provided in the first coordinate direction, multiple groups of the multiple ends being provided in the second coordinate direction, a movable support means forming a measurement probe and supporting: an exit end of said first optical fiber from which said incident beam emerges, said focusing means, said projecting means and said matrix of said input ends of said second fibers, a plurality of detecting means for detecting said scattered beam emerging from exit ends of said first optical fibers, respectively, thereby providing electrical pulses for the first and second coordinate directions, first adding means for adding said electrical pulses provided by said detecting means in the first coordinate direction of said array thereby producing first pulses, second adding means for adding said electrical pulses provided by said detecting means in the second coordinate direction of said array thereby producing second pulses, and computing means for deriving two components of said velocity from said first and second pulses.

12. The velocimeter of claim 11 wherein said detecting means comprise photomultipliers.

13. The velocimeter of claim 11 wherein the fibers in the input plane are arranged in a row and column matrix so that the first pulses are row pulses provided by said detecting means row by row and the second pulses are column pulses provided by said detecting means column by column.

* * * * *